(12) United States Patent
Yano et al.

(10) Patent No.: US 10,295,351 B2
(45) Date of Patent: May 21, 2019

(54) MAP DIFFERENCE DATA DELIVERY SYSTEM, MAP DIFFERENCE DATA DELIVERY DEVICE, MAP DATA HOLDING DEVICE, UPDATE MANAGEMENT SERVER, AND MAP DIFFERENCE EXTRACTION SERVER

(71) Applicant: DENSO CORPORATION, Kariya, Aichi-pref. (JP)

(72) Inventors: Makoto Yano, Chiryu (JP); Yasutaka Atarashi, Kariya (JP); Takamitsu Suzuki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 276 days.

(21) Appl. No.: 14/783,267

(22) PCT Filed: Mar. 21, 2014

(86) PCT No.: PCT/JP2014/001660
§ 371 (c)(1),
(2) Date: Oct. 8, 2015

(87) PCT Pub. No.: WO2014/171068
PCT Pub. Date: Oct. 23, 2014

(65) Prior Publication Data
US 2016/0047659 A1    Feb. 18, 2016

(30) Foreign Application Priority Data

Apr. 16, 2013   (JP) .................................. 2013-085989

(51) Int. Cl.
*G01C 21/26* (2006.01)
*G01C 21/32* (2006.01)
(Continued)

(52) U.S. Cl.
CPC ............ *G01C 21/26* (2013.01); *G01C 21/32* (2013.01); *G06F 17/30241* (2013.01); *G09B 29/106* (2013.01)

(58) Field of Classification Search
CPC .................................. G01C 21/26; G01C 21/32
(Continued)

(56) References Cited

U.S. PATENT DOCUMENTS

| 8,990,012 | B2 * | 3/2015 | Sawai | G01C 21/32 |
|---|---|---|---|---|
| | | | | 701/450 |
| 2006/0095202 | A1 * | 5/2006 | Atarashi | G01C 21/32 |
| | | | | 701/451 |

(Continued)

FOREIGN PATENT DOCUMENTS

| JP | 2006317643 A | 11/2006 |
|---|---|---|
| JP | 2007241003 A | 9/2007 |

(Continued)

OTHER PUBLICATIONS

International Search Report and Written Opinion (in Japanese with English Translation) for PCT/JP2014/001660, dated Jun. 17, 2014; ISA/JP.

*Primary Examiner* — Jacob S. Scott
*Assistant Examiner* — Michael E Butler
(74) *Attorney, Agent, or Firm* — Harness, Dickey & Pierce, P.L.C.

(57) ABSTRACT

A map difference data delivery system includes a map difference data delivery device and a map data holding device. The map difference data delivery device stores map difference data representing a difference between before and after version update and delivers the map difference data. The map difference data includes map elements updated in the version update and dependent map elements by dating back to update of map elements corresponding to a different version. The dependent map elements are map elements that have a dependent relationship and need to be previously updated to avoid conflict with other map elements when updated. The map difference data delivery device groups (Continued)

data of the dependent map elements that have a dependent relationship in the same version.

13 Claims, 7 Drawing Sheets

(51) Int. Cl.
*G09B 29/10* (2006.01)
*G06F 17/30* (2006.01)

(58) Field of Classification Search
USPC .......................................................... 701/532
See application file for complete search history.

(56) References Cited

U.S. PATENT DOCUMENTS

| | | | |
|---|---|---|---|
| 2007/0213929 A1 | 9/2007 | Tanizaki et al. | |
| 2008/0086262 A1 | 4/2008 | Asahara et al. | |
| 2009/0292458 A1* | 11/2009 | Nakamura | G01C 21/32 |
| | | | 701/532 |
| 2011/0191285 A1 | 8/2011 | Sawai | |
| 2013/0030695 A1 | 1/2013 | Nomura et al. | |
| 2013/0031132 A1 | 1/2013 | Nomura et al. | |
| 2013/0144522 A1* | 6/2013 | Irie | G01C 21/3667 |
| | | | 701/430 |
| 2014/0188386 A1* | 7/2014 | Obara | G01C 21/32 |
| | | | 701/532 |

FOREIGN PATENT DOCUMENTS

| | | |
|---|---|---|
| JP | 2008090195 A | 4/2008 |
| JP | 2011158339 A | 8/2011 |
| JP | 2013029358 A | 2/2013 |
| JP | 2013029595 A | 2/2013 |
| WO | WO-2014171108 A1 | 10/2014 |
| WO | WO-2014171109 A1 | 10/2014 |
| WO | WO-2014171110 A1 | 10/2014 |

* cited by examiner

MAP DIFFERENCE DATA DELIVERY SYSTEM, MAP DIFFERENCE DATA DELIVERY DEVICE, MAP DATA HOLDING DEVICE, UPDATE MANAGEMENT SERVER, AND MAP DIFFERENCE EXTRACTION SERVER

CROSS REFERENCE TO RELATED APPLICATIONS

This application is a U.S. National Phase Application under 35 U.S.C. 371 of International Application No. PCT/JP2014/001660 filed on Mar. 21, 2014 and published in Japanese as WO 2014/171068 A1 on Oct. 23, 2014. This application is based on and claims the benefit of priority from Japanese Patent Applications No. 2013-085989 filed on Apr. 16, 2013. The entire disclosures of all of the above applications are incorporated herein by reference.

TECHNICAL FIELD

The present disclosure relates to a map difference data delivery system that delivers map difference data. The disclosure also relates to a map difference data delivery device and a map data holding device included in the map difference data delivery system and to an update management server and a map difference extraction server included in the map difference data delivery device.

BACKGROUND ART

There is a difference between a version of map data before updating map elements such as a road and a version of map data after updating the map elements. A known technology delivers the difference as map difference data to a vehicular navigation unit. The vehicular navigation unit receives the delivered map difference data and updates map data based on the map difference data.

For example, patent literature 1 discloses a technology that delivers map difference data to a vehicular navigation unit. According to the technology, the map difference data is generated in units of map elements, rather than in units of meshes into which a map data layer is divided. To update map elements that are dependent on each other, the technology disclosed in patent literature 1 groups the map elements by dating back to update of the map elements with map data of different versions and generates map difference data to avoid a conflict on a road network. When the dependence exists between map elements, updating one map element requires updating the other map element to prevent the former from conflicting with the latter.

CITATION LIST

Patent Literature

Patent Literature 1: JP-2013-29595 A

SUMMARY OF INVENTION

According to studies by the inventors of this application, the technology disclosed in patent literature 1 may excessively increase the communication traffic of map difference data when delivered. The details are as follows.

After map difference data was once delivered to the vehicular navigation unit, the update of map data for several versions may become available until next delivery. In such a case, the map difference data to be delivered contains all updates of map elements dependent on each other in a range of these dated-back versions. Increasing the number of versions to be dated back also increases the number of times to update the dependent map elements. This may excessively increase the communication traffic when the map difference data is delivered.

The communication traffic may put restrictions on one-time delivery. Alternatively, the communication traffic may be restricted daily or monthly. Increasing the communication traffic too much for map difference data may not be able to deliver the map difference data. For addressing this, map difference data may be simply divided for delivery to satisfy a scope of restrictions. However, the divided partial map difference data alone may conflict with the relationship between the updated map elements such as a road network.

The present disclosure has been made in consideration of the foregoing. It is an object of the disclosure to provide a map difference data delivery system, a map difference data delivery device, a map data holding device, an update management server, and a map difference extraction server that are capable of avoiding conflict on relationship between updated map elements within restrictions on communication traffic when required to deliver map difference data.

A map difference data delivery system in the present disclosure comprises a map difference data delivery device and a map data holding device. The map difference data delivery device includes a map difference data storage portion and a delivery portion. The map difference data storage portion stores map difference data representing a difference between a version of map data after updating map elements and a version of the map data before updating the map elements. The delivery portion delivers the map difference data. The map data holding device includes an update portion that updates map data used in the map data holding device based on the map difference data delivered from the delivery portion. In addition to data of the map elements updated in the version, the map difference data stored in the map difference data storage portion includes data of dependent map elements by dating back to update of map elements corresponding to a different version. The dependent map elements are map elements that have a dependent relationship and need to be previously updated to avoid conflict with other map elements when updated. The map difference data delivery device includes a non-updated data extraction portion, a grouping portion, and a delivery data generation portion. The non-updated data extraction portion extracts non-updated data from the map difference data stored in the map difference data storage portion. The non-updated data is data of map elements not yet updated in the map data holding device. The grouping portion groups data of the dependent map elements that have the dependent relationship in the same version. The delivery data generation portion generates delivery data by arranging records to comply with specified communication traffic. The delivery data is data to be delivered by the delivery portion. Each record is a collection of the non-updated data grouped by the grouping portion. The delivery portion delivers the delivery data generated by the delivery data generation portion to deliver the map difference data.

According to the above, the grouping portion groups the extracted non-updated data that have the dependent relationship in the same version. Therefore, the non-updated data can be grouped based on a minimum unit that prevents conflict on the relationship between map elements from occurring after the map elements are updated within the scope of the same version. The minimum unit corresponds to a record.

The delivery data generation portion generates the delivery data by placing the records in order to comply with specified communication traffic. Therefore, the delivery data can be generated within restrictions on the communication traffic to start from the delivery data containing the record corresponding to the older version. The delivery portion may deliver the delivery data sequentially from the delivery data containing the record corresponding to the older version. This enables the map data holding device to sequentially update the map data from the record corresponding to the older version. Sequentially updating the map data from the record corresponding to the older version prevents the updated map element from conflicting with other map elements, even if map element data to be updated exists across different versions. This is because map elements can be updated in the minimum unit that avoids conflict between the updated map elements.

As a result, the conflict on the relationship between updated map elements can be avoided within restrictions on communication traffic in delivery of map difference data.

The map difference data delivery device, the map data holding device, the update management server, and the map difference extraction server according to the disclosure are used for the map difference data delivery system. Therefore, the map difference data delivery device, the map data holding device, the update management server, and the map difference extraction server can avoid conflict on the relationship between updated map elements within restrictions on communication traffic in the delivery of map difference data.

DESCRIPTION OF EMBODIMENTS

Embodiments of the present disclosure will be described with reference to the accompanying drawings.

1. Map Difference Data Delivery System 100

Figure 1:
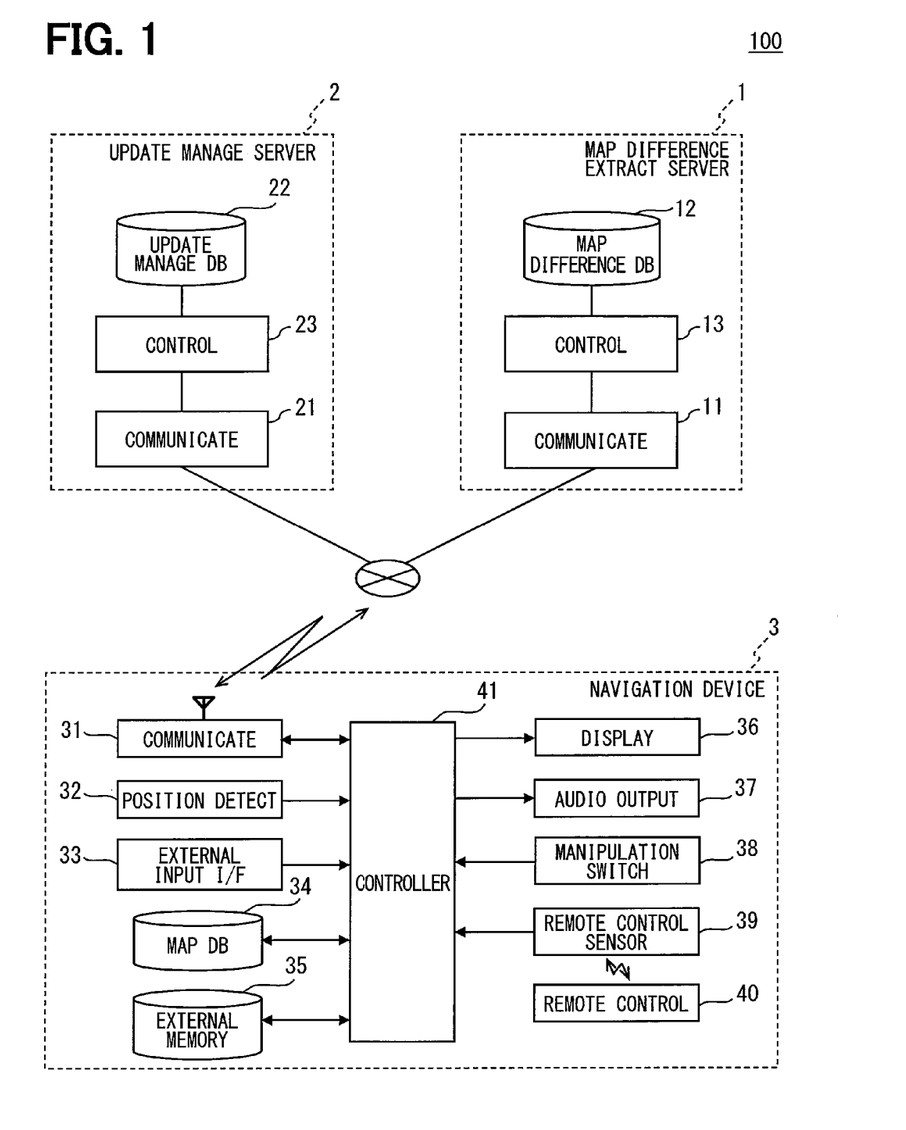
FIG. 1 is a diagram illustrating a schematic configuration of a map difference data delivery system.

FIG. 1 is a diagram illustrating a schematic configuration of a map difference data delivery system 100. The map difference data delivery system 100 in FIG. 1 includes a map difference extraction server 1, an update management server 2, and a navigation apparatus 3. The map difference extraction server 1 and the update management server 2 exemplify a map difference data delivery device.

2. Map Difference Extraction Server 1

As illustrated in FIG. 1, the map difference extraction server 1 includes an extraction server communication portion 11, a map difference database (DB) 12, and an extraction server control portion 13. The extraction server communication portion 11 communicates with the update management server 2 or the navigation apparatus 3 via a communication network.

The map difference DB 12 stores map difference data. The map difference DB 12 exemplifies a map difference data storage portion. The map difference data corresponds to part of map data (base map) that needs to be updated. The map data indicates a positioning manner of map elements. Therefore, the map difference data corresponds to part of the base map containing map elements whose positioning manner is changed from the base map.

The map element denotes, for example, a road, POI (Points Of Interest), a background, a letter representing a geographical name or the like. The map data includes road data containing node data and link data, background data representing topography, text data representing geographical names, and POI data representing various facilities. The map difference DB 12 stores the map difference data supplied from an unshown external server. The map difference data will be described in detail later.

Figure 2:
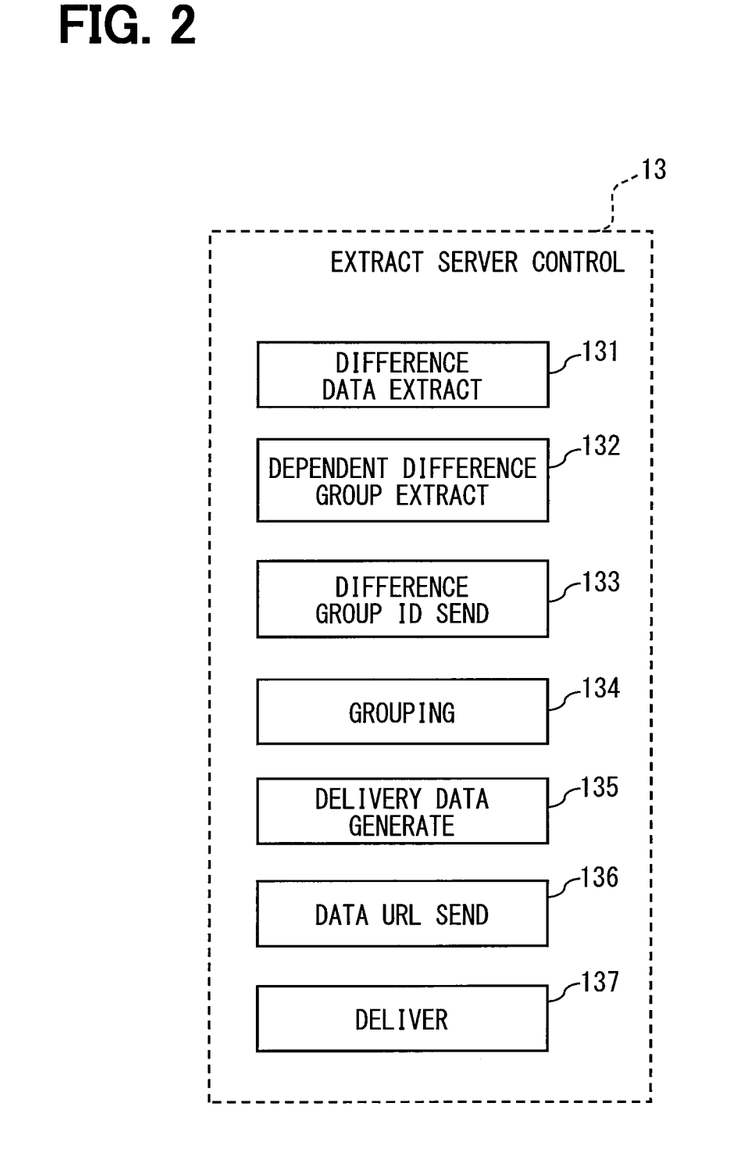
FIG. 2 is a function block illustrating a schematic configuration of an extraction server control portion in a map difference extraction server.

The extraction server control portion 13 includes, as its main component, a microcomputer with a CPU, ROM, RAM, backup RAM, and an I/O device (none shown). The extraction server control portion 13 performs various processes by executing various control programs stored in the ROM based on various information supplied from the extraction server communication portion 11. As illustrated in FIG. 2, the extraction server control portion 13 includes such function blocks as a difference data extraction portion 131, a dependent difference group extraction portion 132, a difference group ID transmission portion 133, a grouping portion 134, a delivery data generation portion 135, a data URL transmission portion 136, and a delivery portion 137. A process in the extraction server control portion 13 will be described in detail later.

<2-1. Map Difference Data>

The map difference data stored in the map difference DB 12 will be described. The map difference data is a difference between map data in a version before updating data of map elements and map data in a version after updating data of map elements. In other words, the difference corresponds to data of map elements updated in respective versions. Opening or closing a road or adding or removing a facility requires updating map elements. The map difference data is managed in units of rectangular meshes into which the map data is divided. Each mesh is given a mesh ID.

In the map difference data, a group (difference group) of data for an updated map element corresponding to each updated version is sequentially supplied with an ID (hereinafter referred to as a difference group ID) to identify the difference group. The updated map element may indicate a road section containing an intersection. In this case, the difference group corresponds to a set of link data and node data representing the road section. As another example, the updated map element may indicate a facility. In this case, the difference group corresponds to a set of POI data or text data representing the facility.

The map difference data also contains data indicating the dependence between map elements. The dependence data may be stored in memory different from the map difference DB 12. A widely known method may be used to generate the map difference data. The map difference data may be generated according to a method similarly to the method disclosed in patent literature 1 referenced in the citation list. The following describes dependence.

<2-2. Dependence>

Figure 3:
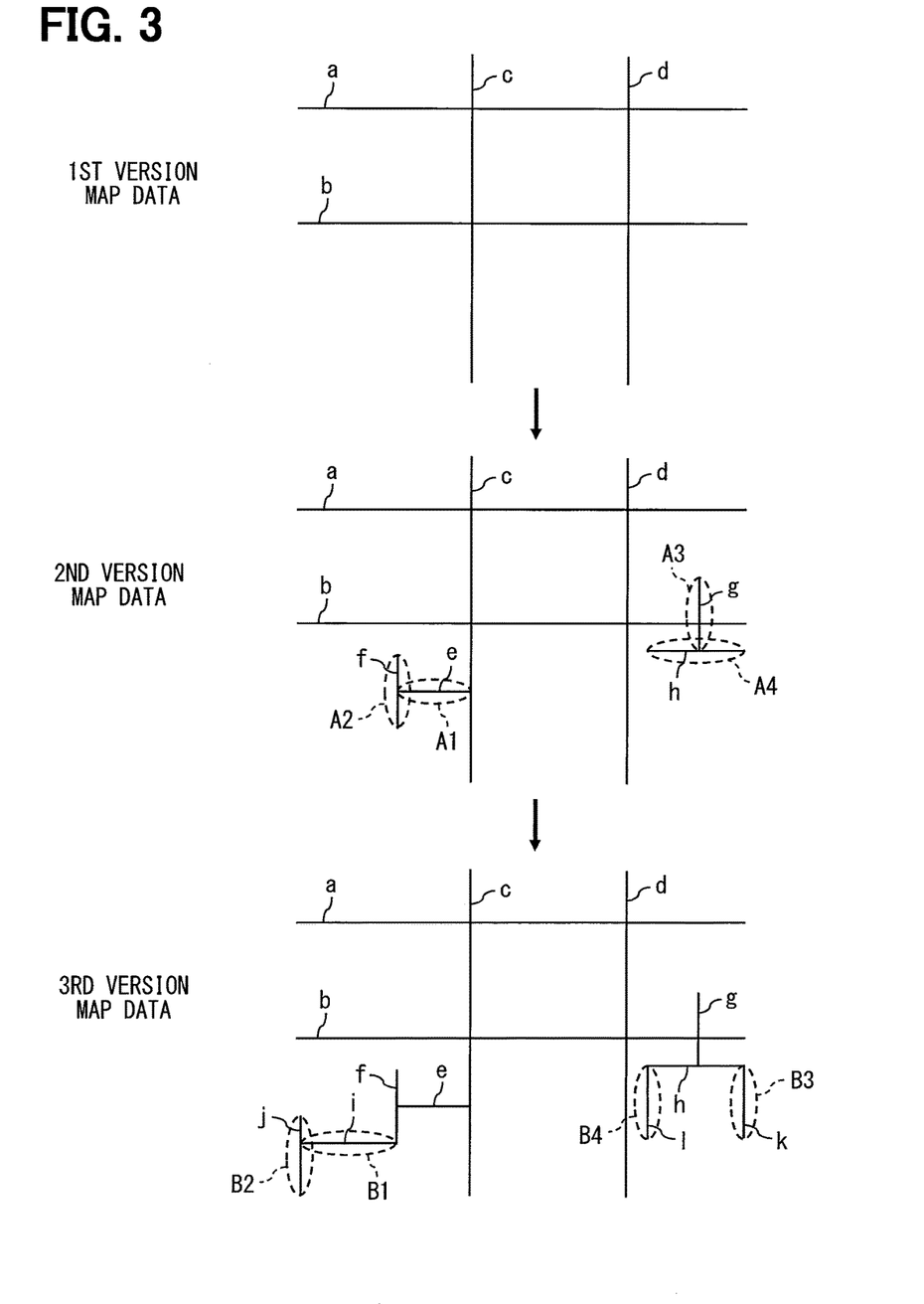
FIG. 3 is a diagram illustrating how map data transitions.

When the dependence exists between map elements, updating one map element (first map element) requires updating another map element (second map element) to prevent the first map element from conflicting with the other map element. The following describes the dependence with reference to FIG. 3. FIG. 3 illustrates the dependence in the map difference data when the map data is updated from the first version to the second version, and the third version in order.

The first version of map data generated contains road sections "a" through "d" that are already present at the time of generating the first version of map data. From this state, road sections "e" through "h" are opened. Then, the second version of map data is generated to reflect addition of road sections "e" through "h" to the first version of map data. In the following description, difference group A1 denotes a group of data indicating road section "e". Difference group A2 denotes a group of data indicating road section "f." Difference group A3 denotes a group of data indicating road section "g." Difference group A4 denotes a group of data indicating road section "h." The groups of data indicating road sections "e" through "h" constitute the updated map elements.

As illustrated in FIG. 3, road section "e" is opened to branch from road section "c." Road section "f" is opened to extend from road section "e." Road section "g" is opened to intersect road section "b." Road section "h" is opened to extend from road section "g."

From this state, road sections "i" through "l" are opened. Then, the third version of map data is generated to reflect addition of road sections "i" through "l" to the second version of map data. In the following description, difference group B1 denotes a group of data indicating road section "i". Difference group B2 denotes a group of data indicating road section "j." Difference group B3 denotes a group of data indicating road section "k." Difference group B4 denotes a group of data indicating road section "l." The groups of data indicating road sections "i" through "l" constitute the updated map elements.

As illustrated in FIG. 3, road section "i" is opened to extend from road section "f." Road section "j" is opened to extend from road section "i." Road sections "k" and "l" are opened to extend from road section "g."

Of the map elements updated in the second version of map data, road section "f" is isolated from the other road sections if road section "e" is not added. Therefore, the dependence exists between road section "f" and road section "e" in such a manner that road section "f" depends on road section "e." The dependence exists between difference group A1 and difference group A2. In the following description, a dependence destination is referred to as "parent." A depending side is referred to as "child." Difference group A1 corresponds to "parent" and difference group A2 corresponds to "child" in the dependence between difference group A1 and difference group A2.

Of map elements updated in the second version of map data, road section "h" is isolated from the other road sections if road section "g" is not added. Therefore, the dependence also exists between road section "h" and road section "g" in such a manner that road section "h" depends on road section "g." According to the dependence, difference group A3 corresponds to "parent" and difference group A4 corresponds to "child."

Of map elements updated in the third version of map data, road section "i" is isolated from the other road sections if road section "f" as the map element updated in the second version of map data is not added. Therefore, the dependence also exists between road section "f" and road section "i" across the versions in such a manner that road section "i" depends on road section "f." According to the dependence, difference group A2 corresponds to "parent" and difference group B1 corresponds to "child."

Of map elements updated in the third version of map data, road section "j" is isolated from the other road sections if road section "i" is not added. Therefore, the dependence also exists between road section "i" and road section "j" in such a manner that road section "j" depends on road section "i." According to the dependence, difference group B1 corresponds to "parent" and difference group B2 corresponds to "child."

Of map elements updated in the third version of map data, road sections "k" and "l" are isolated from the other road sections if road section "h" as the map element updated in the second version of map data is not added. Therefore, the dependence also exists between road sections "k" as well as "l" and road section "i" across the versions in such a manner that road sections "k" and "l" depend on road section "h." According to the dependence, difference group A4 corresponds to "parent" and difference groups B3 and B4 correspond to "child." No dependence exists between difference group B3 and difference group B4.

Figure 4:
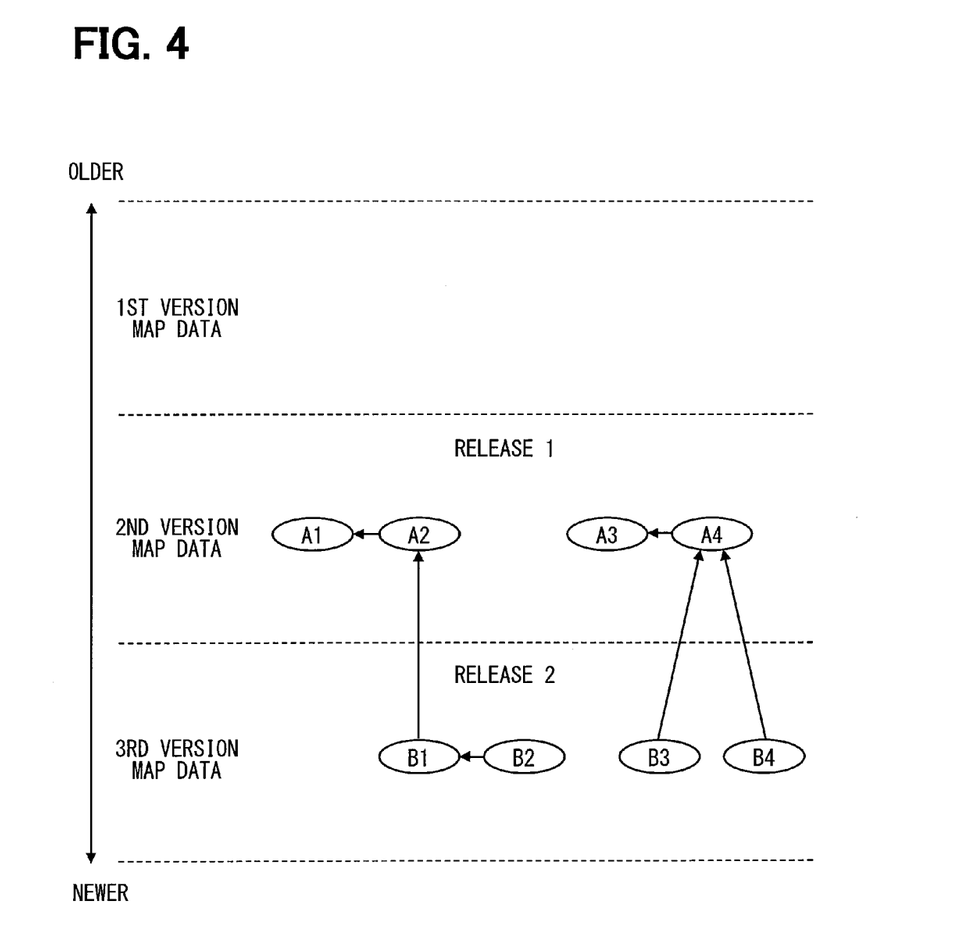
FIG. 4 is a diagram illustrating dependence between map elements.

As illustrated in FIG. 4, the dependence as to difference groups A1 through A4 and B1 through B4 originates from the different versions of difference groups. The dependence can be represented as A1-A2-B1-B2 and A3-A4-B3•B4 in order viewed from "parents." The map difference data stored in the map difference DB 12 also contains the dependence information.

A release signifies a unit corresponding to a set of difference groups in the same version. The releases are counted as release 1, 2, and so on from the oldest version. A set of difference groups indicating map elements updated in the second version of map data is counted as release 1 whose release count is 1. A set of difference groups indicating map elements updated in the third version of map data is counted as release 2 whose release count is 2. Release 1 applies to difference groups A1 through A4. Release 2 applies to difference groups B1 through B4.

FIG. 3 illustrates the dependence in the update of road sections which act as map elements. The same applies to map elements other than road sections. Suppose that a facility is updated as a map element and that the facility is isolated from the other map elements if a road section facing the facility is not updated first. In such a case, the dependence exists between the facility and the road section. Suppose that guidance data to display an image data at a place is updated as a map element and that the guidance data causes a conflict if image data used for the guidance data is not updated first. In such a case, the dependence exists between the guidance data and the image data.

3. Update Management Server 2

As illustrated in FIG. 1, the update management server 2 includes a management server communication portion 21, an update management DB 22, and a management server control portion 23. The management server communication portion 21 communicates with the map difference extraction server 1 or the navigation apparatus 3 via a communication network.

The update management DB 22 stores determination information to determine the map difference data already delivered to the navigation apparatus 3 from the map difference extraction server 1. The update management DB 22 exemplifies a determination information storage portion.

The determination information includes version information already delivered to the navigation apparatus 3. This is because a delivered difference group can be identified if the delivered version information is identified. An already delivered difference group ID is also stored. A release count can be used as the version information. The following description uses the release count as the version information. A delivered release count can be assumed to indicate that all the map elements have been delivered. When several navigation apparatus 3 are available, the update management DB 22 stores the determination information for each user of the navigation apparatus 3.

A flag may be used as the determination information to determine delivered map difference data. The flag may be applied to a delivered difference group (map difference data) and may determine whether or not the difference group is already delivered.

Figure 5:
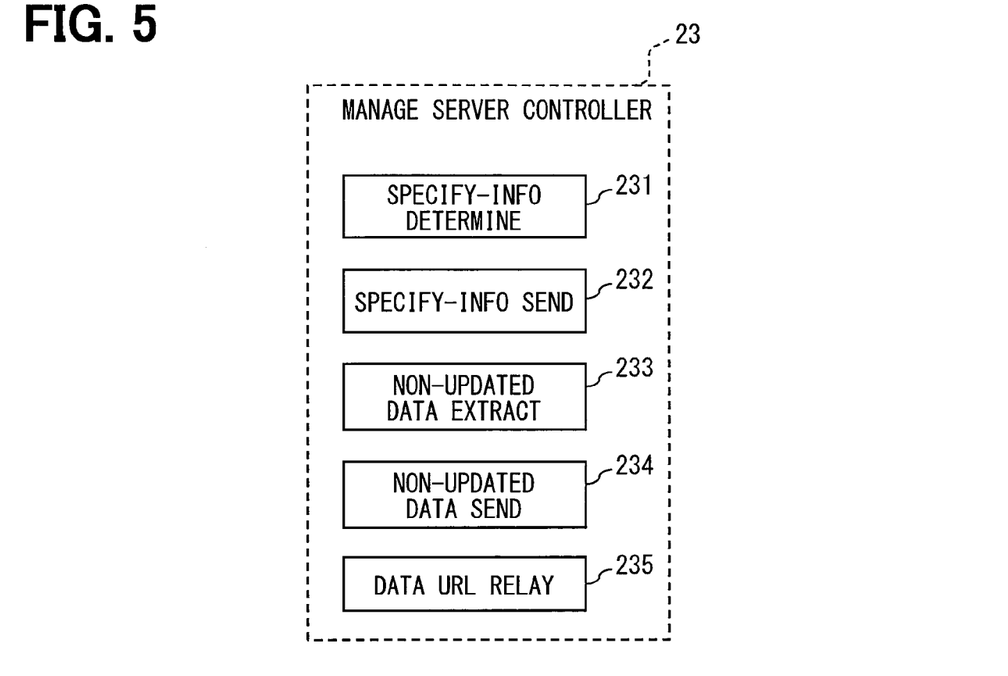
FIG. 5 is a function block illustrating a schematic configuration of a management server control portion in an update management server.

The management server control portion 23 includes, as its main component, a microcomputer with a CPU, ROM, RAM, backup RAM, and an I/O device (none shown). The management server control portion 23 performs various processes by executing various control programs stored in the ROM based on various information supplied from the update management DB 22. As illustrated in FIG. 5, the management server control portion 23 includes such function blocks as a specification information determination portion 231, a specification information transmission portion 232, a non-updated data extraction portion 233, a non-updated data transmission portion 234, and a data URL relaying portion 235. A process in the management server control portion 23 will be described in detail later.

4. Navigation Apparatus 3

The navigation apparatus 3 may be installed in a vehicle or may be available as a portable terminal that can be carried into a vehicle. When the navigation apparatus 3 is portable, the navigation apparatus 3 may be used while a vehicle such as a car, a motorcycle, or a bicycle moves. The navigation apparatus 3 may be also used while a user carrying the navigation apparatus 3 moves by walking. As one example, the following description assumes that the navigation apparatus 3 is an onboard navigation apparatus. The navigation apparatus 3 exemplifies a map data holding device.

When the navigation apparatus 3 is a portable terminal and acquires information from a system such as a vehicular onboard LAN, the navigation apparatus 3 may communicate with the system such as the vehicular onboard LAN based on publicly known wireless communication such as Bluetooth (registered trademark) or wired communication such as USB connection.

The following describes a schematic configuration of the navigation apparatus 3. As illustrated in FIG. 1, the navigation apparatus 3 includes a communicator 31, a position detector 32, an external input interface (I/F) portion 33, a map DB 34, an external memory 35, a display device 36, an audio output device 37, a manipulation switch group 38, a remote control terminal (remote controller) 39, a remote control sensor 40, and a controller 41.

The communicator 31 communicates with the map difference extraction server 1 or the update management server 2 via a communication network. The communicator 31 is available as various onboard communication modules such as DCM (data communication module) used for Telematics communications.

The position detector 32 includes a receiver for a satellite positioning system such as GPS (Global Positioning System) and detects a position of the device based on an acceleration sensor, a gyroscope, and a radio wave from a satellite (all compliant with widely known technologies). The position detector 32 successively detects a current user position (hereinafter referred to as a user position) of the device. The user position can correspond to a coordinate represented in latitude and longitude. The position detector 32 may be part of the above sensors or may use other sensors.

The external input I/F portion 33 provides an interface that allows the controller 41 to acquire information about vehicle states from an ECU or a sensor mounted on the vehicle. The external input I/F portion 33 is supplied with information about vehicle states from the ECU or the sensor mounted on the vehicle via the onboard LAN. The information about vehicle states includes a signal indicating the on/off state of an accessory (ACC) power supply.

The map DB 34 can be stored in a memory card such as an SD card. The map DB 34 stores map data such as the first version of map data described above. The controller 41 may download the map data to be stored in the map DB 34 from an unshown center via the communicator 31 (to be described). Alternatively, the map data may be previously stored in the map DB 34.

The external memory 35 is available as a writable storage device. The external memory 35 stores a large amount of data or specified data that must not be deleted after the power is turned off. The external memory 35 is also used to copy frequently used data from the map DB 34. The external memory 35 may be available as a removable medium whose storage capacity is relatively small. The external memory 35 may store the map DB 34.

The display device 36 is capable of full-color display and may be available as a liquid crystal display, an organic EL display, or a plasma display. The audio output device 37 includes a speaker and outputs audible guidance based on an instruction from the controller 41.

The manipulation switch group 38 includes a touch switch or a mechanical switch integrated with the display device 36. The switch manipulation issues a manipulation instruction and allows the controller 41 to perform various functions. The remote controller 39 includes several manipulation switches (unshown). The switch manipulation allows the remote control sensor 40 to issue various instruction signals to the controller 41. The remote controller 39 can perform the same function as the manipulation switch group 38 on the controller 41.

Figure 6:
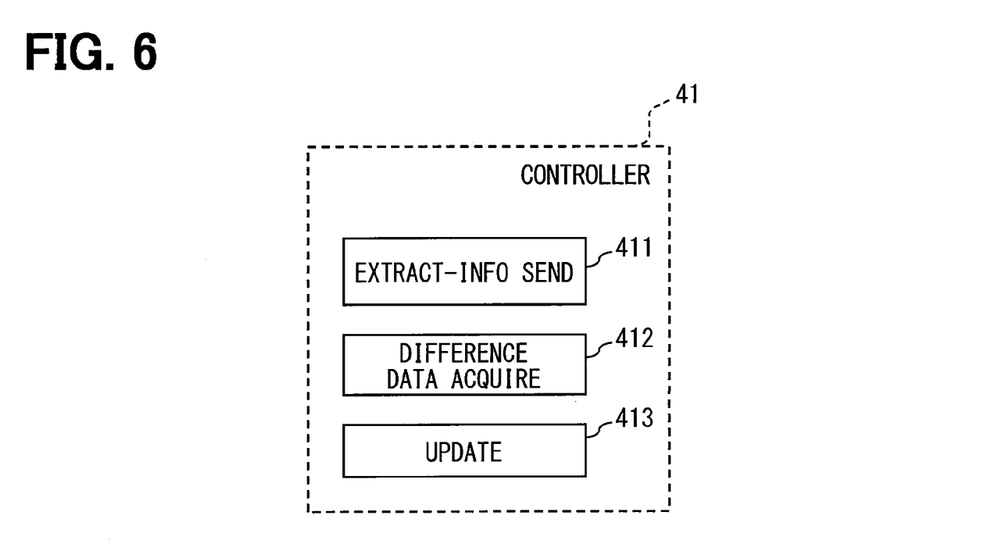
FIG. 6 is a function block illustrating a schematic configuration of a controller in a navigation apparatus.

The controller 41 includes, as its main component, a microcomputer with a CPU, ROM, RAM, and backup RAM. The controller 41 performs various processes based on various information supplied from a communicator 31, a position detector 32, an external input I/F 33, a map DB 34, an external memory 35, a manipulation switch group 38, and a remote control sensor 39. As illustrated in FIG. 6, the controller 41 includes such function blocks as an extraction information transmission portion 411, a difference data acquisition portion 412, and an update portion 413. A process in the controller 41 will be described in detail later.

5. Flow of Processes in the Map Difference Data Delivery System 100

Figure 7:
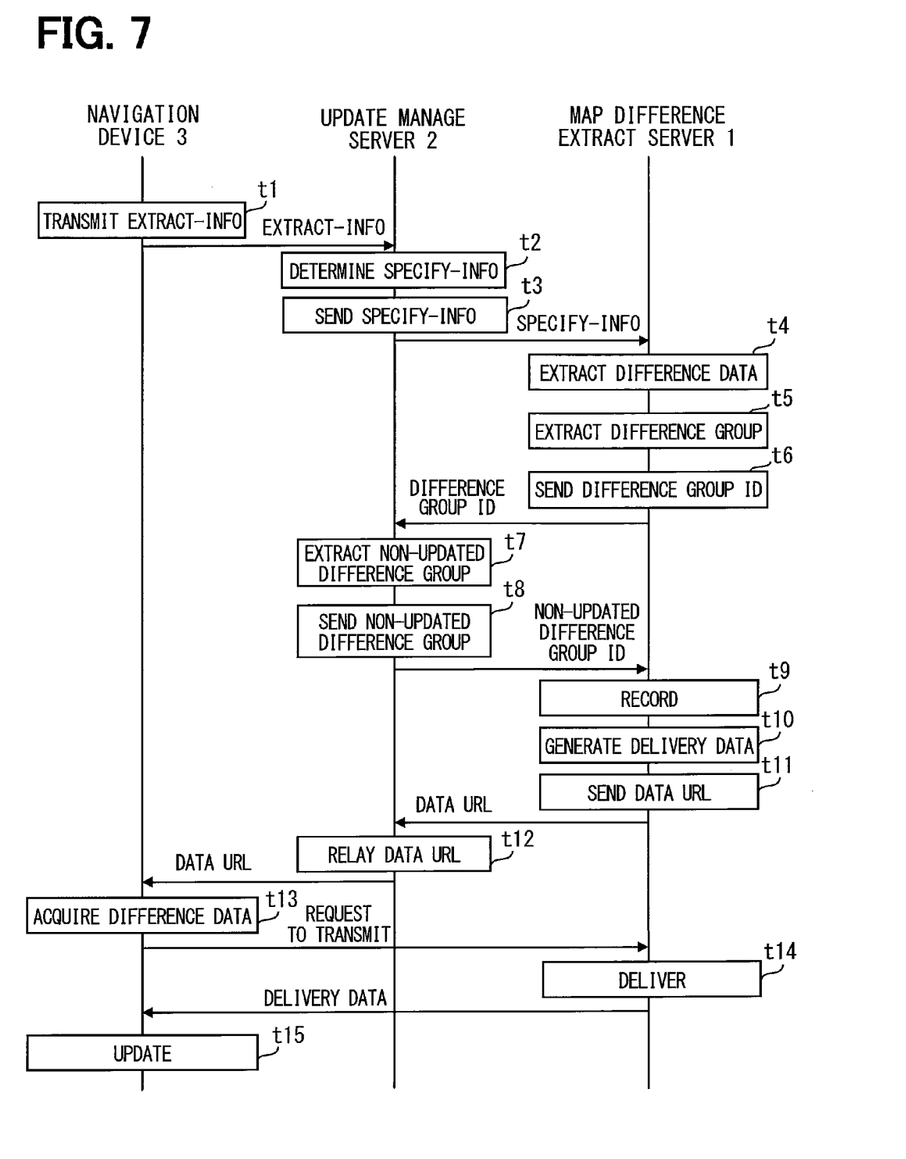
FIG. 7 is a sequence diagram illustrating a process flow in the map difference data delivery system.

Using a sequence diagram in FIG. 7, the following describes a flow of processes in the map difference data delivery system 100.

<t1. Extraction Information Transmission Process (Navigation Apparatus 3)>

The extraction information transmission portion 411 of the controller 41 in the navigation apparatus 3 performs an extraction information transmission process (t1). The extraction information transmission process is performed when a specified trigger is detected. The specified trigger corresponds to turning on an ACC power supply of the vehicle or setting a destination in the navigation apparatus 3. The state of turning on the ACC power supply of the vehicle may be detected based on an ACC power supply on/off signal acquired via the external input I/F portion 33.

The extraction information transmission process causes the communicator 31 to transmit information (extraction information) to the update management server 2. The extraction information enables the map difference extraction server 1 and the update management server 2 to extract the map difference data needed to update map data in the map DB 34 of the navigation apparatus 3.

When the state of turning on the ACC power supply of the vehicle is detected, the extraction information transmission process transmits the extraction information containing a user position detected by the position detector 32, a version of map data in the map DB 34, and identification information to specify the transmission origin. The identification information to specify the transmission origin may correspond to a vehicle ID or a device ID attached to the navigation apparatus 3 or the communicator 31. The following description uses the device ID as the identification information.

When the destination setting is detected, the extraction information transmission process transmits the extraction information containing a user position detected by the position detector 32, a destination coordinate (latitude and longitude), a version of map data in the map DB 34, and a device ID. When a transit place is specified, the extraction information transmission process transmits the extraction information containing the transit place coordinate (latitude and longitude). In the following description, the process is classified into an ACC-on condition and a destination setting condition. Under the ACC-on condition, the process is performed when the state of turning on the ACC power supply of the vehicle is detected. Under the destination setting condition, the process is performed when the destination setting is detected.

<t2. Specification Information Determination Process (Update Management Server 2)>

The management server control portion 23 of the update management server 2 receives the extraction information transmitted from the navigation apparatus 3 via the management server communication portion 21. The specification information determination portion 231 of the management server control portion 23 then performs a specification information determination process (t2).

Based on the received extraction information, the specification information determination process determines specification information to be transmitted to the map difference extraction server 1. The specification information includes the latitude and longitude which acts as a reference point or a release count. The specification information determination process determines whether or not a map data version contained in the extraction information equals a version corresponding to the delivered release count stored in the update management DB 22. If the map data version is older than or equal to the delivered release count, this release count is used as the release count for the specification information. Information about the correspondence between the map data version and the release count is pre-stored in the management server control portion 23.

The map data version contained in the extraction information may be newer than the version corresponding to the delivered release count stored in the update management DB 22. In this case, the release count corresponding to the map data version is used as the release count for the specification information. The map data version contained in the extraction information is newer than the version corresponding to the delivered release count when a user purchases a new version of map data to store it in the map DB 34.

The specification information determination process under the ACC-on condition determines the specification information that contains the latitude and longitude of a user position and the release count. The specification information determination process under the destination setting condition determines the specification information that contains the latitude and longitude of a user position, the latitude and longitude of a destination, and a release count. When a transit place is specified, the specification information determination process determines the specification information that further contains the latitude and longitude of the transit place.

<t3. Specification Information Transmission Process (Update Management Server 2)>

The specification information transmission portion 232 of the management server control portion 23 in the update management server 2 performs a specification information transmission process (t3). The specification information transmission process transmits the specification information determined in the specification information determination process to the map difference extraction server 1 via the management server communication portion 21.

<t4. Difference Data Extraction Process (Map Difference Extraction Server 1)>

The extraction server control portion 13 in the map difference extraction server 1 receives the specification information transmitted from the update management server 2 via the extraction server communication portion 11. The difference data extraction portion 131 of the extraction server control portion 13 then performs a difference data extraction process (t4).

Based on the received specification information, the difference data extraction process extracts, from the map difference data stored in the map difference DB 12, a difference group whose difference group ID is to be transmitted to the update management server 2. The difference group is extracted as follows.

A map element to cover a wide range such as an expressway belongs to a difference group (hereinafter referred to as a countrywide delivered difference group) whose update is assumed to be beneficial to all users. Of such countrywide delivered difference groups, the difference data extraction process extracts a countrywide delivered difference group contained in a release whose count is greater than the release count contained in the specification information. This extraction is independent of the ACC-on condition and the destination setting condition. In other words, the difference data extraction process extracts a countrywide delivered difference group contained in the release that is not delivered yet. For example, the difference data extraction portion 131 may be configured to determine that a difference group containing a link whose road type is expressway belongs to the countrywide delivered difference group. A difference group ID attached to the countrywide delivered difference group is hereinafter referred to as a countrywide delivered ID.

Under the ACC-on condition, the difference data extraction process computes the mesh ID of a mesh that at least partially overlaps a specified rectangular range (hereinafter referred to as a requested rectangular range) centered around the latitude and longitude of the user position contained in the specification information. The specified rectangular range may cover 10 km in the east-west and north-south directions. The difference data extraction process extracts a difference group (hereinafter referred to as a personally delivered difference group) that is contained in the mesh indicated by the computed mesh ID and belongs to a release whose count is greater than the release count contained in the specification information. The difference data extraction process does not extract a difference group whose mesh ID equals the difference group ID of the countrywide delivered difference group.

Under the destination setting condition, the difference data extraction process computes the mesh ID of a mesh that at least partially overlaps the requested rectangular range centered around the latitude and longitude of the user position contained in the specification information. When the specification information contains the latitude and longitude of a transit place, the difference data extraction process also computes the mesh ID of a mesh that at least partially overlaps the requested rectangular range centered around the latitude and longitude of the transit place.

The difference data extraction process searches for a route from the user position to the destination and computes the mesh IDs of meshes covering the searched route. A publicly known route search method may be used to search for routes. The difference data extraction process extracts a difference group that is contained in the mesh indicated by the computed mesh ID and belongs to a release whose count is greater than the release count contained in the specification information. This difference group is also hereinafter referred to as a personally delivered difference group. The difference data extraction process does not extract a difference group whose mesh ID equals the difference group ID of the countrywide delivered difference group. A difference group ID attached to the personally delivered difference group is hereinafter referred to as a personally delivered ID.

<t5. Dependent Difference Group Extraction Process (Map Difference Extraction Server 1)>

The dependent difference group extraction portion 132 performs a dependent difference group extraction process (t5). The dependent difference group extraction process extracts a difference group that depends on a difference group extracted by the difference data extraction process and the countrywide delivered difference group. The dependent difference group extraction process extracts a dependent difference group from difference groups belonging to a release whose count is greater than the release count contained in the specification information. The dependent difference group denotes a difference group that depends on the difference group extracted by the difference data extraction process and the countrywide delivered difference group.

The difference data extraction process does not extract a dependent difference group that corresponds to the difference group extracted by the difference data extraction process and to the dependent difference group in the countrywide delivered difference group. A difference group ID attached to the dependent difference group is hereinafter referred to as a dependent difference ID.

The difference data extraction process may not extract any difference group. In such a case, a result of no difference group may be returned to the update management server 2. No process is performed subsequently to the process at t5 if no difference group is extracted.

<t6. Difference Group ID Transmission Process (Map Difference Extraction Server 1)>

The difference group ID transmission portion 133 of the extraction server control portion 13 in the map difference extraction server 1 performs a difference group ID transmission process (t6). The difference group ID transmission process causes the extraction server communication portion 11 to transmit the personally delivered ID, the countrywide delivered ID, and the dependent difference ID to the update management server 2. The personally delivered ID is attached to the personally delivered difference group extracted by the difference data extraction process. The countrywide delivered ID is attached to the countrywide delivered difference group extracted by the difference data extraction process. The dependent difference ID is attached to the dependent difference group extracted by the dependent difference group extraction process.

<t7. Non-Updated Difference Group Extraction Process (Update Management Server 2)>

The management server control portion 23 in the update management server 2 receives the personally delivered ID, the countrywide delivered ID, and the dependent difference ID transmitted from the map difference extraction server 1 via the management server communication portion 21. The non-updated data extraction portion 233 of the management server control portion 23 then performs a non-updated difference group extraction process (t7).

The non-updated difference group extraction process extracts a difference group (hereinafter referred to as a non-updated difference group) that has not been delivered to the navigation apparatus 3 yet, from the difference groups belonging to the difference groups indicated by the personally delivered ID, the countrywide delivered ID, and the dependent difference ID received. For example, the non-updated difference group extraction process extracts the non-updated difference group by extracting a difference group ID from the personally delivered ID, the countrywide delivered ID, and the dependent difference ID received except a difference group ID that is already delivered and is stored in the update management DB 22.

The non-updated difference group extraction process may not extract any non-updated difference group. In such a case, a result of no non-updated difference group may be returned to the map difference extraction server 1. No process is performed subsequently to the process at t7 if no non-updated difference group is extracted.

<t8. Non-Updated Difference Group Transmission Process (Update Management Server 2)>

The non-updated data transmission portion 234 of the management server control portion 23 in the update management server 2 performs a non-updated difference group transmission process (t8). In the non-updated difference group transmission process, the management server communication portion 21 transmits to the map difference extraction server 1 the difference group ID attached to the non-updated difference group extracted by the non-updated difference group extraction process. A difference group ID attached to the non-updated difference group is hereinafter referred to as a non-updated group ID. The non-updated difference group exemplifies non-updated data.

<t9. Record Process (Map Difference Extraction Server 1)>

The extraction server control portion 13 in the map difference extraction server 1 allows the extraction server communication portion 11 to receive the non-updated group ID transmitted from the update management server 2. The grouping portion 134 of the extraction server control portion 13 then performs a record process (t9).

The record process groups, of the non-updated difference groups extracted by the non-updated difference group extraction process, non-updated difference groups that use the same release count and are dependent on each other, based on dependence setting information contained in the map difference data stored in the map difference DB 12. A collection of grouped non-updated difference groups is referred to as a record.

Figure 8:
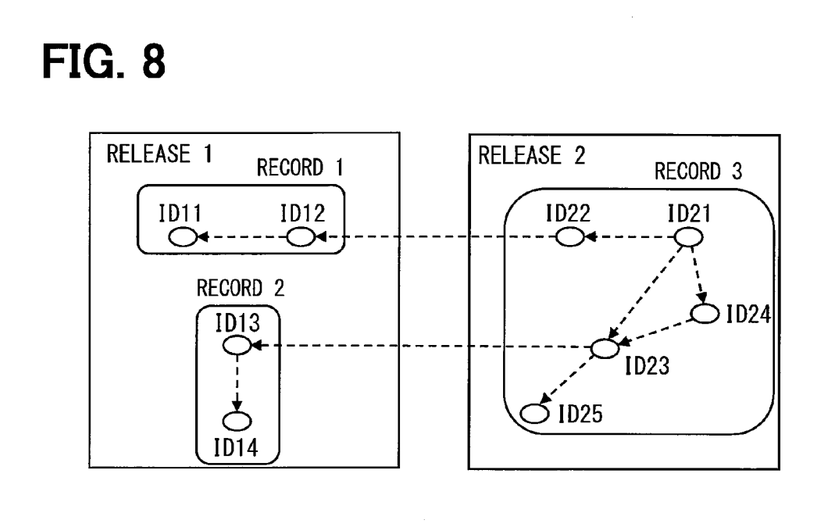
FIG. 8 is a diagram illustrating a record process.

Using FIG. 8, the following describes an example of grouping in the record process. According to the example in FIG. 8, non-updated groups in release 1 include four difference groups (simply denoted as ID11 through ID14) corresponding to difference group IDs 11 through 14. Non-updated groups in release 2 include five difference groups (simply denoted as ID21 through ID25) corresponding to difference group IDs 21 through 25. The tip of a dashed arrow indicates "parent" and the beginning thereof indicates "child" in relation to the dependence.

In terms of the dependence between non-updated groups according to the example in FIG. 8, ID11 acting as "parent" corresponds to ID12 acting as "child." ID14 acting as "parent" corresponds to ID13 acting as "child." ID12 acting as "parent" corresponds to ID22 acting as "child." ID13 acting as "parent" corresponds to ID23 acting as "child." Also, ID22 acting as "parent" corresponds to ID21 acting as "child." ID25 acting as "parent" corresponds to ID23 acting as "child." ID23 acting as "parent" corresponds to ID24 and ID21 acting as "children." ID24 acting as "parent" corresponds to ID21 acting as "child."

Release 1 contains ID11, ID12, ID13, and ID14. ID11 and ID12 serving as the minimum unit of the dependence are grouped. ID13 and ID14 serving as the minimum unit of the dependence are grouped. A group of ID11 and ID12 is hereinafter referred to as record 1. A group of ID13 and ID14 is hereinafter referred to as record 2. Release 2 contains ID21 through ID25 as the minimum unit of the dependence. A group of ID21 through ID25 is hereinafter referred to as record 3.

The grouping portion 134 may previously group countrywide delivered difference groups that belong to the same release count and are dependent on each other. The non-updated difference group extraction process may extract a non-updated difference group that corresponds to a countrywide delivered difference group. Such non-updated difference groups may be grouped in units of records previously grouped by the grouping portion 134.

The countrywide delivered difference group is aimed at all users, not prepared on an individual user basis. Prior to the record process at t9, the process may be configured to group difference groups that belong to the same release count and are dependent on each other. Namely, the difference groups may be grouped before the map difference extraction server 1 receives the specification information corresponding to each user.

All the previously grouped difference groups may correspond to non-updated groups. In such a case, the grouped difference groups may be used as a record. The previously grouped difference groups may contain a difference group that does not correspond to a non-updated group. In such a case, the grouped difference groups may be used as a record by excluding the difference group that does not corresponds to a non-updated group.

This eliminates the need to group countrywide delivered difference groups each time the specification information corresponding to each user is received. This can reduce the processing time or the processing load on the map difference extraction server 1

<t10. Delivery Data Generation Process (Map Difference Extraction Server 1)>

The delivery data generation portion 135 of the extraction server control portion 13 in the map difference extraction server 1 performs a delivery data generation process (t10). The delivery data generation process generates delivery data by sequentially placing records grouped by the record process in ascending order of versions given to the records, in order to satisfy the specified communication traffic. An older version of record is synonymous with a record whose release count is smaller.

The specified communication traffic may be set to any value such as 3 MB. The delivery data may be generated so that the compressed communication traffic complies with the specified communication traffic. Records in excess of the specified communication traffic are sequentially placed in ascending order of versions given to the records to generate the next delivery data.

Figure 9:
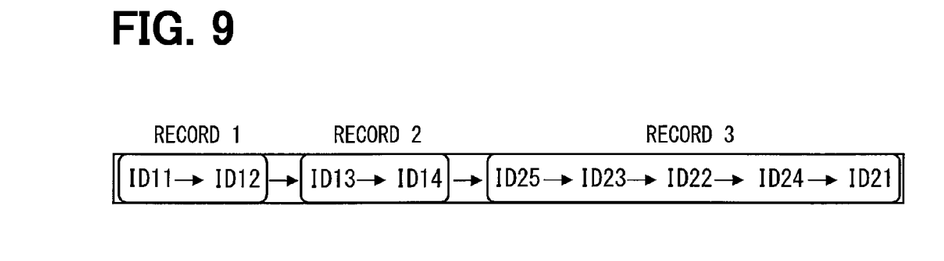
FIG. 9 is a diagram illustrating a delivery data generation process.

FIG. 9 illustrates how the delivery data generation process generates delivery data. FIG. 9 assumes that non-updated difference groups are grouped in units of records as illustrated in FIG. 8.

The delivery data is placed in ascending order of versions given to the records. Therefore, the records are placed so that records 1 and 2 precede record 3. Records of the same release count are placed in ascending order of difference group IDs. Difference groups in a record are placed in descending order of the number of "children" associated with "parent" as a difference group.

As a result, the delivery data is generated in the order of records 1, 2, and 3. Record 1 contains the difference groups in the order of ID11-ID12. Record 2 contains the difference groups in the order of ID13-ID14. Record 3 contains the difference groups in the order of ID25-ID23-ID22-ID24-ID21. The delivery data generated by the delivery data generation process is stored in large-capacity nonvolatile memory such as HDD not shown.

A record associated with the difference group ID corresponding to the countrywide delivered ID may precede a record associated with the difference group ID corresponding to the personally delivered ID.

<t11. Data URL Transmission Process (Map Difference Extraction Server 1)>

The data URL transmission portion 136 of the extraction server control portion 13 in the map difference extraction server 1 performs a data URL transmission process (t11). In the data URL transmission process, the extraction server communication portion 11 transmits a data URL and a difference group ID to the update management server 2. The data URL indicates the address of delivery data that is generated by the delivery data generation process and is stored in the memory. The difference group ID is attached to a non-updated difference group contained in the delivery data.

<t12. Data URL Relaying Process (Update Management Server 2)>

When the management server communication portion 21 of the management server control portion 23 in the update management server 2 receives the data URL transmitted from the map difference extraction server 1, the data URL relaying portion 235 of the management server control portion 23 performs a data URL relaying process (t12). In the data URL relaying process, the management server communication portion 21 transmits the received data URL to the navigation apparatus 3.

When a difference group ID is transmitted from the map difference extraction server 1, the management server control portion 23 may store the difference group ID as an already delivered difference group ID in the update management DB 22.

<t13. Difference Data Acquisition Process (Navigation Apparatus 3)>

When the communicator 31 of the controller 41 in the navigation apparatus 3 receives the data URL transmitted from the update management server 2, the difference data acquisition portion 412 of the controller 41 performs a difference data acquisition process (t13). The difference data acquisition process accesses an address indicated by the received data URL and requests transmission of the delivery data stored at the address.

<t14. Delivery Process (Map Difference Extraction Server 1)>

The delivery portion 137 of the extraction server control portion 13 in the map difference extraction server 1 performs a delivery process (t14). In the delivery process, the extraction server communication portion 11 delivers the delivery data requested by the difference data acquisition process to the navigation apparatus 3. The delivery data generation process may generate several pieces of delivery data. In such a case, the delivery process delivers the delivery data containing records in ascending order of versions given to the records.

<t15. Update Process (Navigation Apparatus 3)>

After the controller 41 in the navigation apparatus 3 receives via the communicator 31 the delivery data delivered from the map difference extraction server 1, the update portion 413 of the controller 41 performs an update process (t15). The update process synthesizes the map data in the map DB 34 with the hitherto received delivery data (i.e., the map difference data) each time the navigation apparatus 3 reads necessary map data from the map DB 34 by performing an application program that provides guidance based on the map data.

The delivery data generated by the delivery data generation process may be stored in a server other than the map difference extraction server 1. In this case, the navigation apparatus 3 may request the server storing the delivery data to transmit the delivery data during the difference data acquisition process. The server storing the delivery data may deliver the delivery data.

According to the sequence diagram in FIG. 7, the map difference data is delivered to the navigation apparatus 3 from the map difference extraction server 1. However, the embodiment is not limited thereto. A memory card storing the map DB 34 may be connected to a PC. The map difference data is delivered to the PC from the map difference extraction server 1. The map difference data may be stored in the memory card. In this case, the PC connecting with the memory card storing the map DB 34 exemplifies a map data holding device.

The requested rectangular range may correspond to a district where the user resides when the map difference data is delivered to the PC instead of the navigation apparatus 3. The district where the user resides may be replaced by a province where the user resides. The district or the province where the user resides may be associated with a user ID and may be previously stored in the memory of the map difference extraction server 1.

6. Summary of the Embodiment

According to the embodiment, a non-updated difference group needs to be previously updated to avoid conflict with the other map elements. The non-updated difference group can be updated within the scope of the same release count (i.e., the same version) in units of records, namely, minimum units to ensure the dependence. Therefore, the map data can be updated in minimum units that can prevent conflict on the relationship between the updated map elements. When delivery of the map difference data is subject to a restriction on the communication traffic, the relationship between the updated map elements can be free from conflict while the communication traffic for the map difference data to be delivered complies with the restriction.

7. Modification 1

According to the embodiment, the map difference data delivery system 100 includes the map difference extraction server 1 and the update management server 2 that are independent of each other. However, the embodiment is not limited thereto. The map difference data delivery system 100 may include a server that functions as both the map difference extraction server 1 and the update management server 2. Namely, the map difference data delivery system 100 may include a server into which the map difference extraction server 1 and the update management server 2 are integrated.

8. Modification 2

According to the embodiment, the map difference data delivery system 100 does not include a server (map difference data generation server) that generates the map difference data from map data before and after the update each time the map data is updated. However, the embodiment is not limited thereto. The map difference data delivery system 100 may include the map difference data generation server. The map difference data generation server may be integrated with the map difference extraction server 1 or the update management server 2.

9. At Last

Embodiments of the present disclosure are not limited to the above-illustrated embodiments. The above-illustrated embodiments can be modified in various ways. Embodiments that may result from an appropriate combination of the technical means disclosed in different embodiments are also embodiments of the present disclosure.

What is claimed is:

1. A system for updating a map in a navigation device of a vehicle, the system comprising:
 a map difference data delivery device including a map difference extraction server having a map difference database, wherein the map difference database stores map difference data representing a difference between a version of map data after updating map elements and a version of the map data before updating the map elements, wherein the map difference extraction server delivers the map difference data to the navigation device; and the navigation device, wherein the navigation device includes a communicator in communication with the map difference extraction server of the map difference data delivery device, a position detector configured to detect a position of the navigation device, a map database that stores the map, a display device configured to display the map, and a controller having a different data acquisition portion configured to acquire the map difference data from the map difference extraction server of the map difference data delivery device through the communicator, and an update portion, the update portion configured to update the map stored in the map database and used in the navigation device based on the map difference data delivered from the map difference extraction server through the communicator and received by the different data acquisition portion of the controller, wherein in addition to data of the map elements updated in the version, the map difference data stored in the map difference database includes data of dependent map elements by dating back to update of map elements corresponding to a different version, wherein the dependent map elements are map elements that have a dependent relationship and need to be previously updated to avoid conflict with other map elements when updated, wherein the map difference data delivery device further includes:

an update management server that extracts non-updated data from the map difference data stored in the map difference database, wherein the non-updated data is data of map elements not yet updated in the navigation device;

and wherein the map difference extraction server groups data of the dependent map elements that have the dependent relationship in the same version, generates delivery data by arranging records to comply with specified communication traffic, wherein the delivery data is data to be delivered by the map difference extraction server, wherein each record is a collection of the non-updated data grouped by the map difference extraction server, and delivers the map difference data to the navigation device through the communicator by delivering the delivery data to the navigation device through the communicator, wherein the update portion of the controller updates the map in the navigation device based on the delivered map difference data, and wherein the display device displays the map, updated by the update portion of the controller based on the delivered map difference data, to provide navigation guidance to a user of the navigation device of the vehicle.

2. The map difference data delivery system according to claim 1, wherein by sequentially placing the records from the record corresponding to an older version to comply with the specified communication traffic, the map difference extraction server generates the delivery data, which is the data to be delivered by the map difference extraction server, wherein each record is the collection of the non-updated data grouped by the map difference extraction server.

3. The map difference data delivery system according to claim 1, wherein the map difference extraction server delivers the map difference data by delivering the delivery data generated by the map difference extraction server sequentially from the record corresponding to the older version.

4. The map difference data delivery system according to claim 1, wherein the map difference data delivery device includes:

an update management database that stores determination information, wherein the determination information determines the map difference data already delivered to the navigation device, wherein the update management server extracts the non-updated data by using the determination information stored in the update management database.

5. The map difference data delivery system according to claim 1, wherein:

the update management server extracts the non-updated data based on reception of specified information from the navigation device; and when the update management server extracts the non-updated data, the map difference extraction server groups the extracted non-updated data dependent on each other in the same version.

6. The map difference data delivery system according to claim 5, wherein based on receipt of a current position of a user of the navigation device as the specified information from the navigation device, the update management server extracts the non-updated data corresponding to the map elements positioned around the current position in the map data.

7. The map difference data delivery system according to claim 5, wherein based on receipt a current position and a destination of a user of the navigation device as the specified information from the navigation device, the update management server extracts the non-updated data corresponding to the map element positioned around the current position, around the destination, and around a route from the current position to the destination.

8. The map difference data delivery system according to claim 1, wherein the update management server is separate from the map difference extraction server.

9. The map difference data delivery system according to claim 8, wherein:

the map difference data delivery device includes the update management database that stores determination information, wherein the determination information determines the map difference data already delivered to the navigation device.

10. A map difference data delivery device used in the map difference data delivery system of claim 1.

11. A map difference extraction server used for the map difference data delivery system of claim 1.

12. The map difference data delivery system according to claim 1, wherein the navigation device includes a display that displays image data based on the updated map data.

13. The map difference data delivery system according to claim 1, wherein the navigation device includes a speaker that outputs audible guidance based on the updated map data and an instruction from the controller.

* * * * *